(No Model.)

W. BRUNQUEST.
CAR BRAKE.

No. 421,664. Patented Feb. 18, 1890.

WITNESSES:

INVENTOR:
W. Brunquest
BY
Munn & Co
ATTORNEYS

UNITED STATES PATENT OFFICE.

WILLIAM BRUNQUEST, OF MENOMINEE, MICHIGAN.

CAR-BRAKE.

SPECIFICATION forming part of Letters Patent No. 421,664, dated February 18, 1890.

Application filed December 17, 1889. Serial No. 334,016. (No model.)

*To all whom it may concern:*

Be it known that I, WILLIAM BRUNQUEST, of Menominee, in the county of Menominee and State of Michigan, have invented a new and Improved Car-Brake, of which the following is a full, clear, and exact description.

This invention relates to car-brakes, the object of the invention being to provide a simple, cheap, and durable brake, so arranged as to be applied directly to the axle, in lieu of being applied to the wheel-tread, whereby the wheel-tread is saved from undue wear.

To the ends named the invention consists of eccentrics that are mounted in bearings at either side of the axle, an endless chain which runs in connection with said eccentrics, and a means for turning said chain, all as will be hereinafter fully described, and specifically pointed out in the claims.

Reference is to be had to the accompanying drawings, forming a part of this specification, in which similar figures and letters of reference indicate corresponding parts in all the views.

Figure 1:
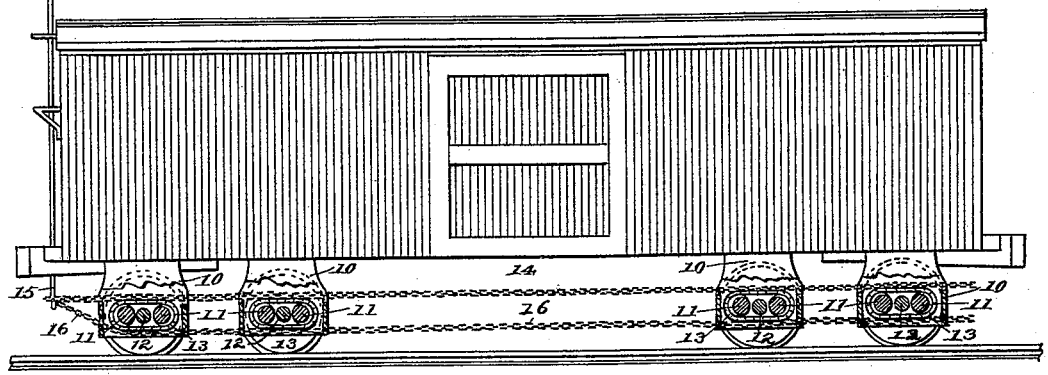
Figure 2:
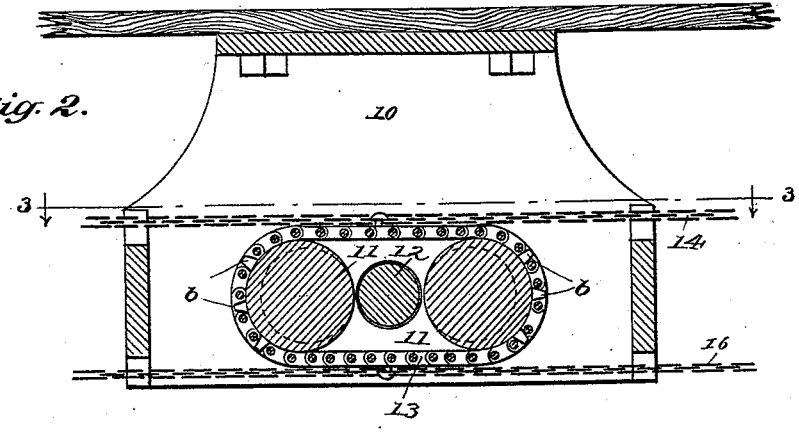
Figure 3:
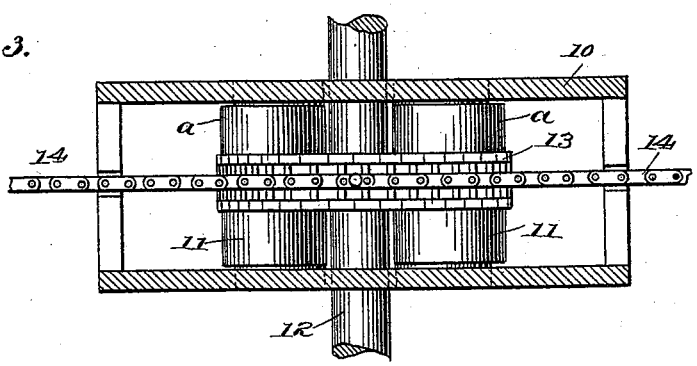

Figure 1 is a side view of a car, representing the same as it appears when provided with my improved brake, parts being broken away, and the car-axles and car-brake mechanism being shown in section. Fig. 2 is an enlarged sectional elevation of my improved brake mechanism, and Fig. 3 is a sectional plan view on line 3 3 of Fig. 2.

In the drawings, 10 represents a casing that is arranged for connection with the car-floor, and formed with bearings in which there are mounted rollers 11, having eccentric faces *a*. Between the rollers 11 the car-axle 12 passes. In connection with the rollers 11, I arrange an endless chain or belt 13, such chain or belt engaging teeth *b*, which extend from the peripheral faces of the rollers.

Such an apparatus as the one above described may be arranged in connection with each of the car-axles, and if such arrangement be adopted all of the chains or belts 13 should be connected by an operating-chain 14, which said chain 14 is connected with the brake-staff 15, whereby if said staff be revolved the chain 14 will be drawn upon and the chains 13 moved so that the rollers 11 will be turned to a position such that they will bear hard upon the peripheral faces of the axles 12, thus tending to check the rotation of such axles.

In order that the chains 13 may be moved back, so that the eccentric faces of the rollers may be thrown from engagement with the axles 12, I connect a second chain 16 to the chains 13, which chain, if the brake-staff be turned in an opposite direction, will draw upon the chains 13 and move them in a direction such that the desired freeing of the axles will be brought about.

Having thus described my invention, I claim as new and desire to secure by Letters Patent—

1. The combination, with a car-axle, of eccentric-faced rollers arranged in connection therewith, and a means for turning said rollers, substantially as described.

2. The combination, with a car-axle, of eccentric-faced rollers arranged in connection therewith, a chain or belt arranged in connection with said rollers, an operating-chain leading from the roller-chain, and a brake-staff to which the operating-chain is connected.

3. The combination, with the axles of a car, of eccentric-faced rollers arranged in connection therewith, chains 13, arranged in connection with the rollers, chains 14 and 16, connected to the chains 13, and brake-staffs to which the chains 14 and 16 are connected.

WILLIAM BRUNQUEST.

Witnesses:
 FRANKLIN H. BROWN,
 ARTHUR L. LEWIS.